United States Patent
Ellsworth (10) Patent No.: US 10,034,473 B1
(45) Date of Patent: Jul. 31, 2018

(54) BELOW GROUND BLIND ASSEMBLY

(71) Applicant: Douglas Ellsworth, Victor, NY (US)

(72) Inventor: Douglas Ellsworth, Victor, NY (US)

(*) Notice: Subject to any disclaimer, the term of this patent is extended or adjusted under 35 U.S.C. 154(b) by 0 days.

(21) Appl. No.: 15/480,984

(22) Filed: Apr. 6, 2017

(51) Int. Cl.
| | |
|---|---|
| *A01M 31/02* | (2006.01) |
| *E04H 14/00* | (2006.01) |
| *H02S 99/00* | (2014.01) |
| *H02J 7/35* | (2006.01) |
| *E04H 15/00* | (2006.01) |

(52) U.S. Cl.
CPC .......... *A01M 31/025* (2013.01); *E04H 14/00* (2013.01); *H02J 7/35* (2013.01); *H02S 99/00* (2013.01); *E04H 15/001* (2013.01)

(58) Field of Classification Search
CPC .... A01M 31/025; E04H 14/00; E04H 15/001; H02J 7/35; H02S 99/00
USPC ........................................................ 52/169.6
See application file for complete search history.

(56) References Cited

U.S. PATENT DOCUMENTS

| | | | |
|---|---|---|---|
| 3,018,857 A * | 1/1962 | Parham ................. | E04H 15/001 135/901 |
| 3,513,605 A | 5/1970 | Smith | |
| 3,799,608 A * | 3/1974 | Smutny ................. | E04H 1/1205 135/115 |
| 3,886,678 A | 6/1975 | Caccamo | |
| D247,715 S * | 4/1978 | Worley, Jr. ................. | D22/199 |
| 4,110,941 A | 9/1978 | Scott | |
| 4,682,436 A * | 7/1987 | Ritson ................. | A01M 31/025 135/901 |
| 4,738,045 A | 4/1988 | Cardoza | |
| 4,751,936 A * | 6/1988 | Zibble ................. | A01M 31/025 135/117 |
| 4,794,717 A | 1/1989 | Horsmann | |
| 4,798,019 A * | 1/1989 | Sury ................... | A01M 31/025 135/901 |
| 4,805,360 A * | 2/1989 | Kuehnl ..................... | E04H 9/12 52/169.1 |
| 5,339,852 A * | 8/1994 | Bull ..................... | A01M 31/025 135/124 |
| 5,479,738 A | 1/1996 | Danna | |
| 7,325,364 B2 | 2/2008 | Leininger et al. | |
| D579,121 S | 10/2008 | Gibson | |
| 8,966,831 B1 * | 3/2015 | Stoll ................... | A01M 31/025 403/335 |
| 9,648,867 B1 * | 5/2017 | Keller ................. | A01M 31/025 |
| 9,758,985 B2 * | 9/2017 | Hayes .................... | E04H 15/001 |
| 2003/0172574 A1 | 9/2003 | Drummond | |
| 2010/0124458 A1* | 5/2010 | Munro .................... | E02D 29/12 404/26 |
| 2010/0253118 A1* | 10/2010 | Gressette, III ........ | A01M 31/02 297/188.01 |

(Continued)

*Primary Examiner* — Charles A Fox
*Assistant Examiner* — James Buckle, Jr.

(57) ABSTRACT

A below ground blind assembly for concealing a hunter below ground includes a box that is selectively positioned in a hole in the ground thereby facilitating a hunter to sit in the box. A cover is removably positioned on the box to conceal the hunter. In this way game is inhibited from seeing the hunter. The cover having an opening therein and a weapon is selectively extended outwardly therefrom. In this way the hunter may shoot the game from the box. A power supply is coupled to the box and the power supply selectively supplies power to an extrinsic electronic device.

17 Claims, 6 Drawing Sheets

(56) References Cited

U.S. PATENT DOCUMENTS

| | | | |
|---|---|---|---|
| 2012/0299339 A1* | 11/2012 | Birch | A01M 31/02 297/188.01 |
| 2012/0304551 A1* | 12/2012 | Preg | A01M 31/025 52/65 |
| 2016/0053477 A1* | 2/2016 | McInerney | E04H 15/001 52/745.14 |
| 2016/0083972 A1* | 3/2016 | Hayes | E04H 15/001 135/121 |

* cited by examiner

BELOW GROUND BLIND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to blind devices and more particularly pertains to a new blind device for concealing a hunter below ground.

BRIEF SUMMARY OF THE INVENTION

An embodiment of the disclosure meets the needs presented above by generally comprising a box that is selectively positioned in a hole in the ground thereby facilitating a hunter to sit in the box. A cover is removably positioned on the box to conceal the hunter. In this way game is inhibited from seeing the hunter. The cover having an opening therein and a weapon is selectively extended outwardly therefrom. In this way the hunter may shoot the game from the box. A power supply is coupled to the box and the power supply selectively supplies power to an extrinsic electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
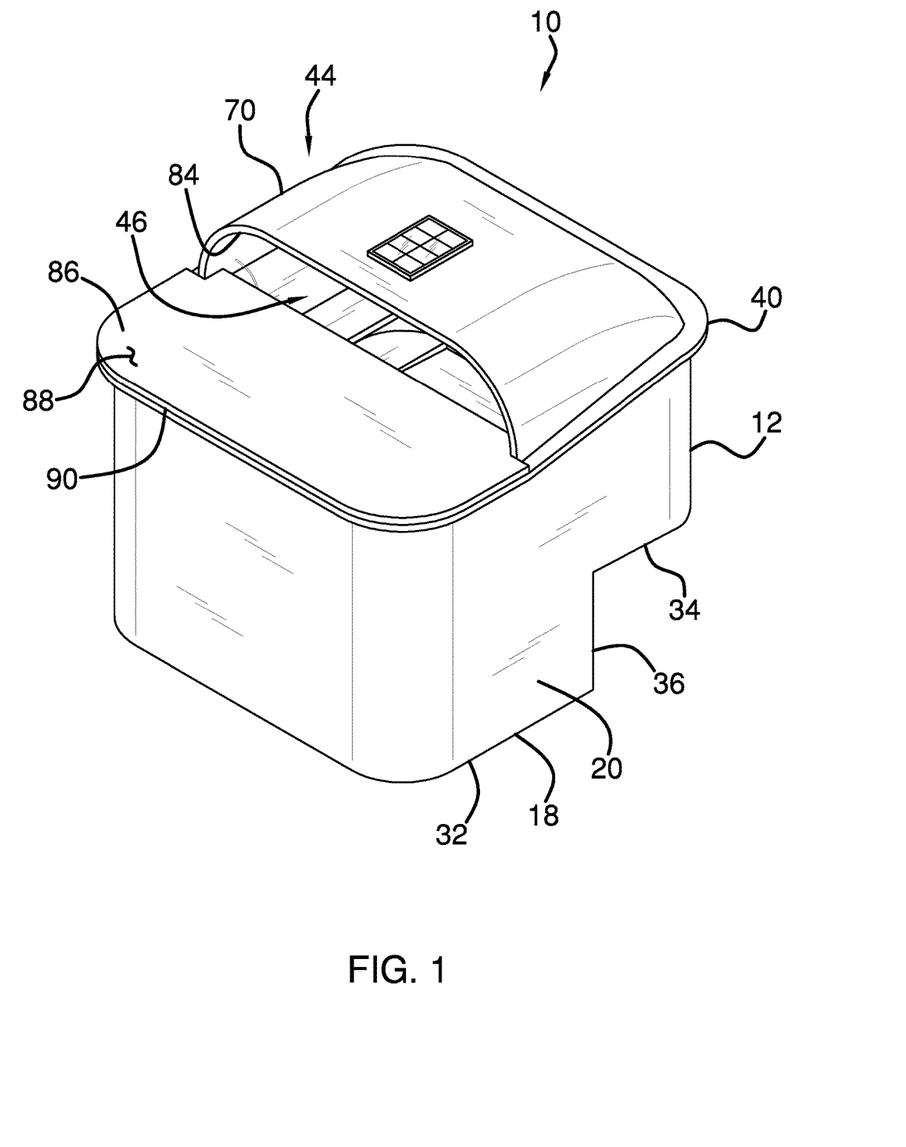
FIG. 1 is a top perspective view of a below ground blind assembly according to an embodiment of the disclosure.
Figure 2:
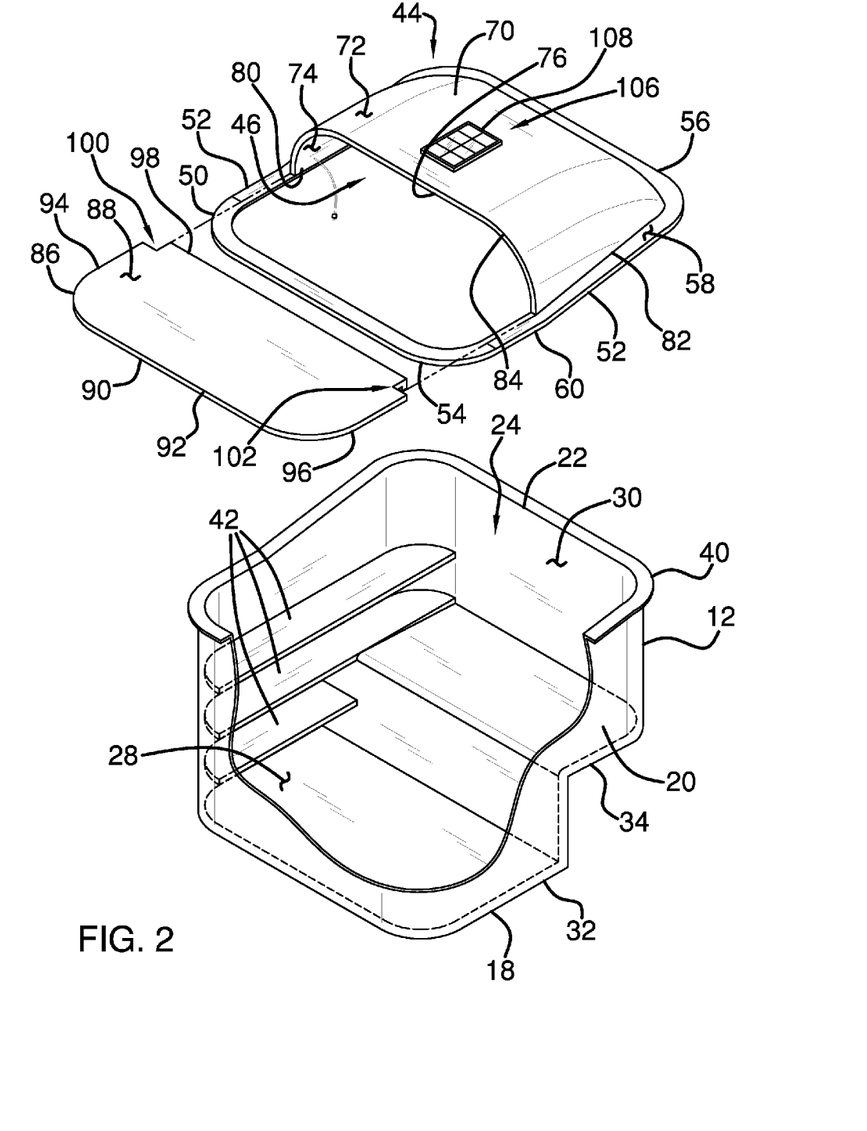
FIG. 2 is an exploded cut-away view of an embodiment of the disclosure.
Figure 3:
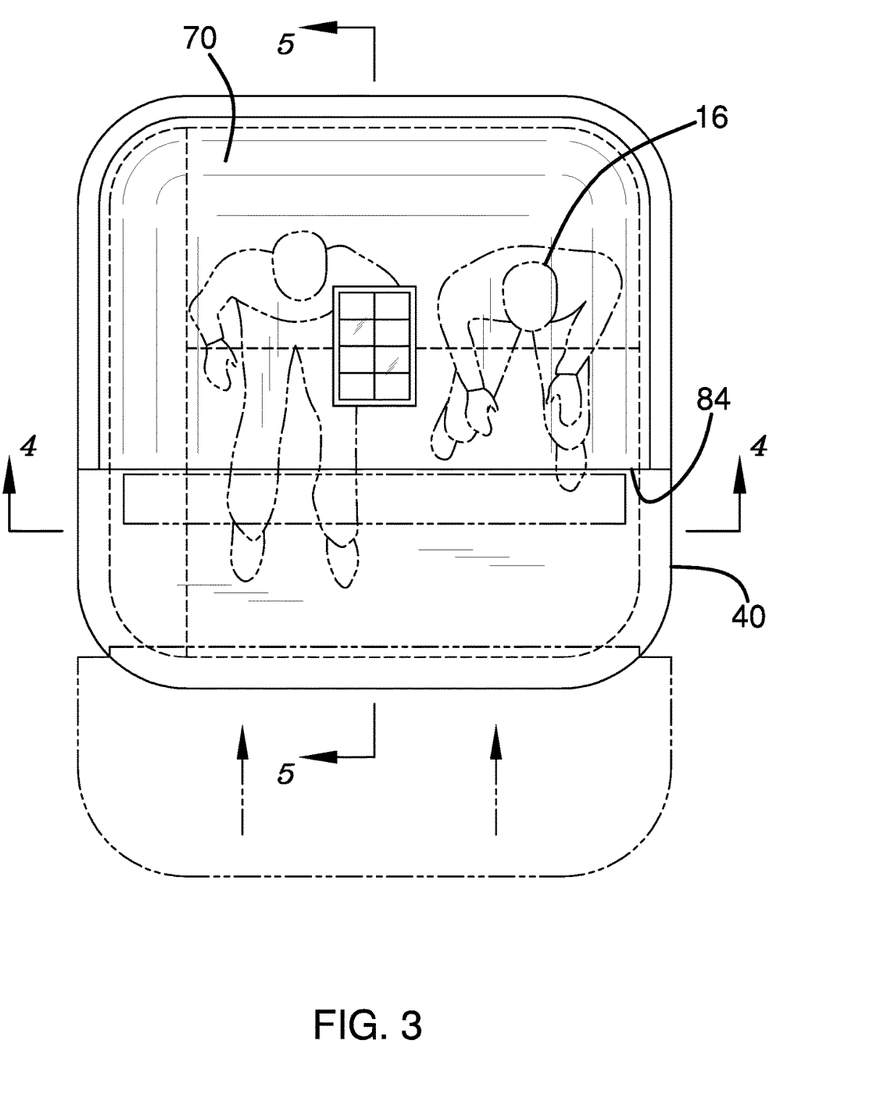
FIG. 3 is a top phantom view of an embodiment of the disclosure.
Figure 4:
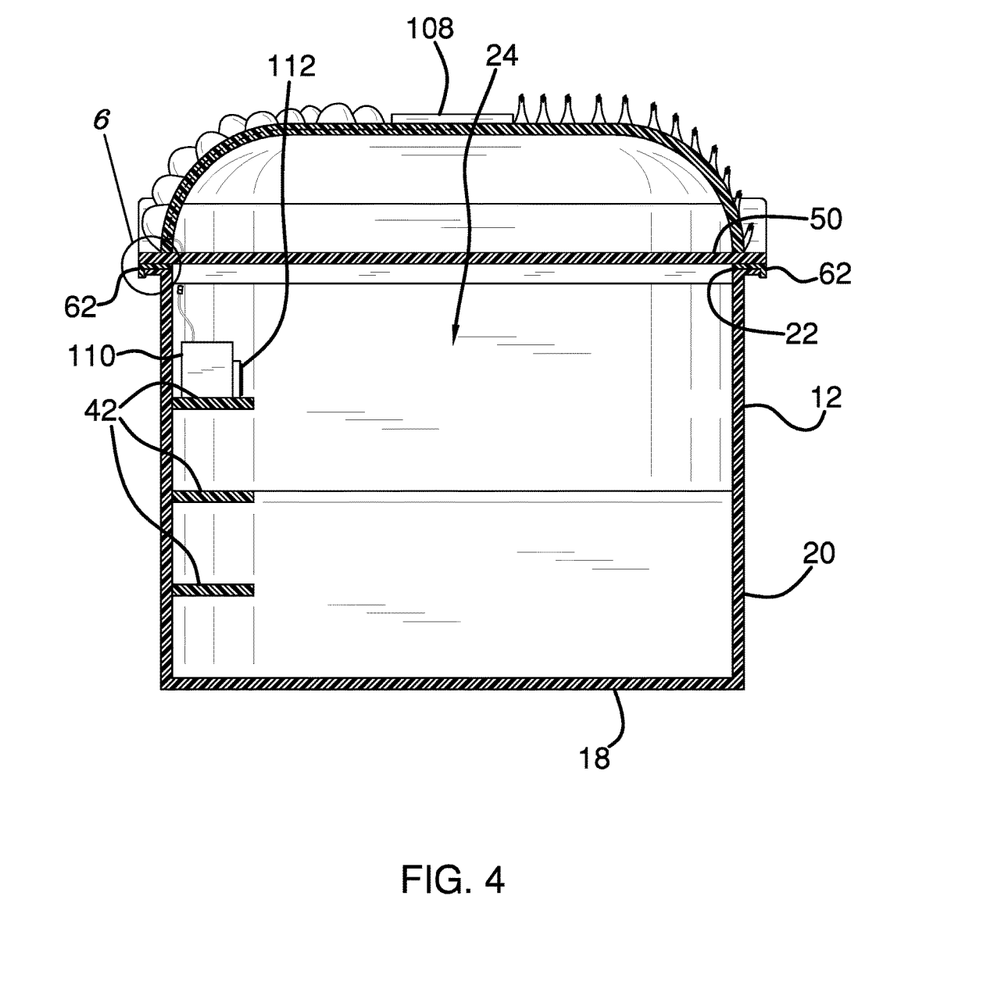
FIG. 4 is a cross sectional view taken along line 4-4 of FIG. 3 of an embodiment of the disclosure.
Figure 5:
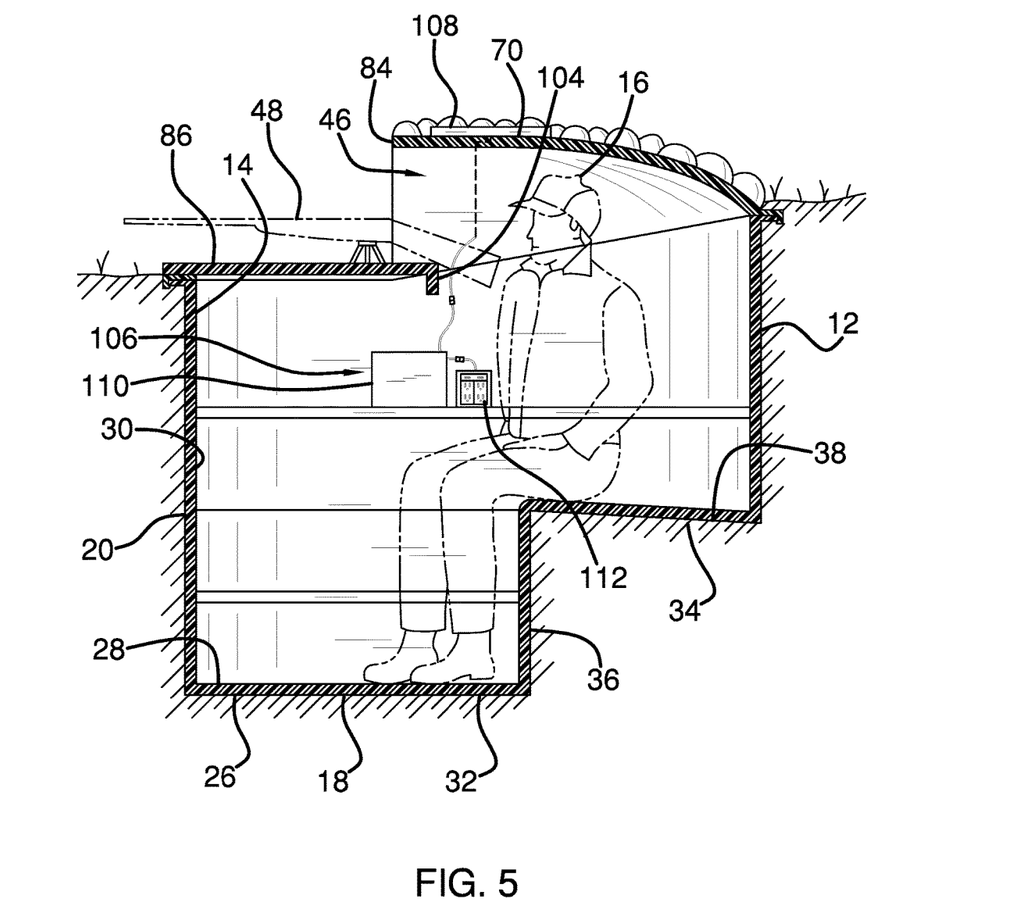
FIG. 5 is a cross sectional view taken along line 5-5 of FIG. 3 of an embodiment of the disclosure.
Figure 6:
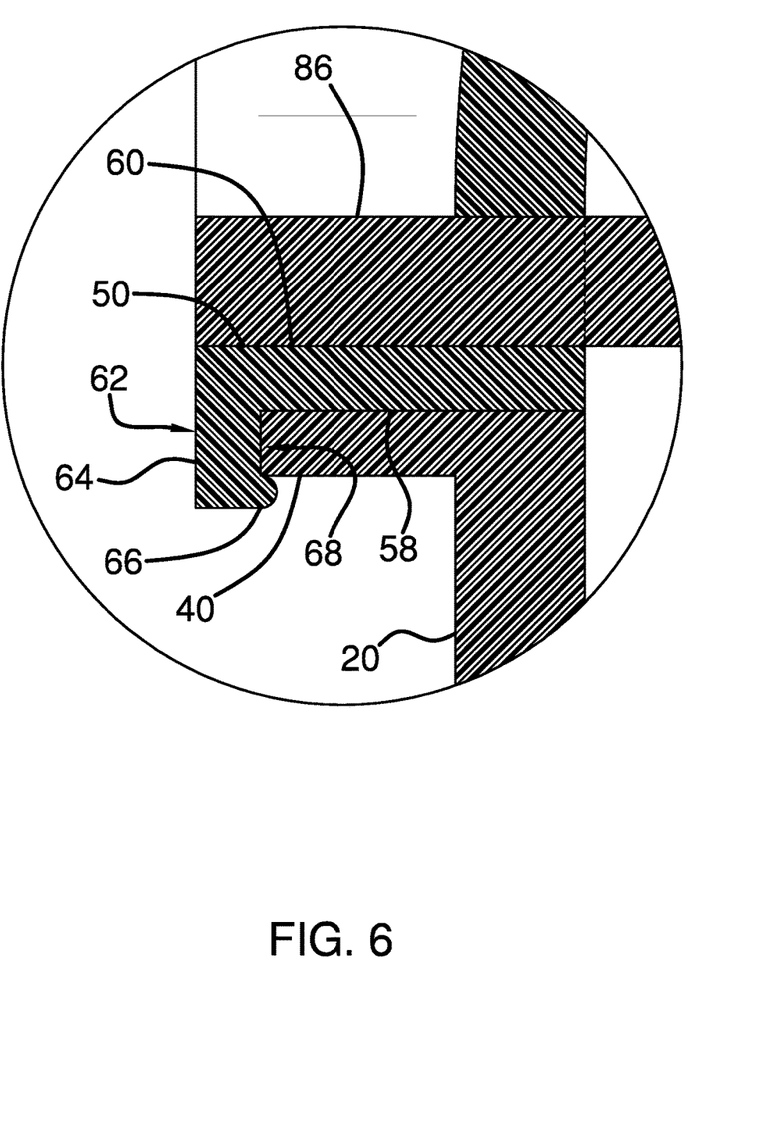
FIG. 6 is a detail view taken from circle 6 of FIG. 4 of an embodiment of the disclosure.

With reference now to the drawings, and in particular to FIGS. 1 through 6 thereof, a new blind device embodying the principles and concepts of an embodiment of the disclosure and generally designated by the reference numeral 10 will be described.

As best illustrated in FIGS. 1 through 6, the below ground blind assembly 10 generally comprises a box 12 that is selectively positioned in a hole 14 in the ground thereby facilitating a hunter 16 to sit in the box 12. The box 12 has a basal wall 18 and a perimeter wall 20 extending upwardly therefrom. The perimeter wall 20 has a distal edge 22 with respect to the basal wall 18 and the distal edge 22 defines an opening 24 to access an interior of the box 12.

The basal wall 18 has a lower surface 26 and an upper surface 28 and the perimeter wall 20 has an inwardly facing surface 30. The basal wall 18 is longitudinally divided into a lower portion 32 and an upper portion 34. The box 12 has a first wall 36 extending upwardly between the lower portion 32 and the upper portion 34. Moreover, the lower surface 26 corresponding to each of the lower portion 32 and the upper portion 34 rests on a lower bounding surface 38 of the hole 14 having the distal edge 22 being aligned with the ground. The hunter 16 sits on the upper surface 28 corresponding to the upper portion 34.

A lip 40 is coupled to and extends outwardly from the perimeter wall 20. The lip 40 is aligned with and is coextensive with the distal edge 22. Thus, the lip 40 lies on the ground when the box 12 is positioned in the hole 14. A plurality of steps 42 is provided and each of the steps 42 is coupled to the inwardly facing surface 30 of the perimeter wall 20. Each of the steps 42 is horizontally oriented such that each of the steps 42 is stood on to enter the box 12. The steps 42 are spaced apart from each other and are distributed between the basal wall 18 and the distal edge 22 of the box 12.

A cover 44 is provided and the cover 44 is removably positioned on the box 12. In this way the cover 44 conceals the hunter 16 thereby inhibiting game from seeing the hunter 16. The cover 44 has an opening 46 therein and a weapon 48 is selectively extended outwardly therefrom. In this way the hunter 16 may shoot the game when the hunter 16 is in the box 12.

The cover 44 comprises a surround 50 that has a pair of lateral members 52 extending between a front member 54 and a back member 56. The lateral members 52 are spaced apart from each other such that the surround 50 forms an open rectangle. Moreover, the surround 50 has a top surface 58 and a bottom surface 60. A pair of catches 62 is provided and each of the catches 62 is coupled to and extends downwardly from the bottom surface 60 of an associated one of the lateral members 52.

Each of the catches 62 is coextensive with the associated lateral member 52 and each of the catches 62 comprises a leg 64 and a foot 66. The foot 66 corresponding to each of the catches 62 is spaced from the bottom surface 60 to define a lip space 68 between the catches 62 and the surround 50. Additionally, the foot 66 corresponding to each of the catches 62 is directed toward each other. The lip space 68 corresponding to each of the catches 62 slidably receives the lip 40 on the box 12 such that the surround 50 lies on the lip 40 when the cover 44 is positioned on the box 12. In this way the surround 50 is inhibited from being urged upwardly from the box 12.

The cover 44 includes a panel 70 that has a first surface 72, a second surface 74 and a peripheral edge 76 extending therebetween. The peripheral edge 76 has a first lateral side 78, a second lateral side 80, a back side 82 and a front side 84. The panel 70 is concavely arcuate between the first lateral side 78 and the second lateral side 80. Each of the first lateral side 78 and the second lateral side 80 is coupled to the top surface 58 corresponding to an associated one of the lateral members 52. Moreover, the front side 84 arcs upwardly from the surround 50 to define the opening 46 in the cover 44. The front side 84 is spaced from the front member 54 and the back side 82 is coupled to the top surface 58 of the back member 56.

A shelf 86 is provided that has an upper surface 88, a lower surface 90 and an outer edge 92 extending therebetween. The outer edge 92 has a first lateral side 94, a second lateral side 96 and a rear side 98. The first lateral side 94 of the shelf 86 has a first notch 100 extending toward the second lateral side 80 of the shelf 86 and the first notch 100 is aligned with the rear side 98. The second lateral side 80 of the shelf 86 has a second notch 102 extending toward the first lateral side 78 of the shelf 86 and the second notch 102 is aligned with the rear side 98.

The lower surface 26 of the shelf 86 abuts the top surface 58 corresponding to the first lateral members 52 of the surround 50. Moreover, the front side 84 of the panel 70 extends into each of the first notch 100 and the second notch 102. The upper surface 28 is spaced from the front side 84 of the panel 70 to support the weapon 48. In this way the weapon 48 may shoot from the box 12. The weapon 48 may be a rifle, a cross bow or any other projectile based hunting weapon 48. A stop 104 is coupled to and extends downwardly from the lower surface 26 of the shelf 86. The stop 104 is aligned with and is coextensive with the rear side of the shelf 86.

A power supply 106 is coupled to the box 12 and the power supply 106 selectively supplies power to an extrinsic electronic device. The extrinsic electronic device may be a heater, a cell phone charger or any other electronic device requiring AC current. The power supply 106 comprises a solar panel 108 that is coupled to the first surface 72 of the panel 70. In this way the solar panel 108 is exposed to sunlight.

A battery 110 is positioned on a selected one of the steps 42 and the battery 110 is electrically coupled to the solar panel 70 such that the solar panel 70 charges the battery 110. An inverter 112 is positioned on a selected one of the steps 42. The inverter 112 is electrically coupled to the battery 110 such that the inverter 112 converts DC current from the battery 110 into AC current. The extrinsic electronic device 108 is selectively plugged into the inverter 112.

In use, the hole 14 is dug in the ground and the lower bounding surface 38 of the hole 14 is structured to accommodate the upper 34 and lower 32 portions of the basal wall 18. The box 12 is placed in the hole 14 and the cover 44 is manipulated to engage the box 12. Dirt, rocks or other debris are selectively placed on the cover 44 to camouflage the cover 44 from the game. The hunter 16 steps on the steps 42 to enter the box 12 and the shelf 86 is positioned on the cover 44. The hunter 16 sits on the upper portion 34 of the basal wall 18 and the weapon 48 is extended through the opening 46 in the cover 44. The hole 14 is dug in an open area such as a field or the like that does not afford cover to conceal the hunter 16. In this way the box 12 facilitates the hunter 16 to be located in the open area without being detected by the game. Moreover, each of the catches 62 on the cover 44 inhibits the cover 44 from being inadvertently removed by wind or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A below ground blind assembly being configured to facilitate a hunter to be positioned below ground, said assembly comprising:

a box being configured to be positioned in a hole in the ground thereby facilitating a hunter to sit in said box, said box having a basal wall and a perimeter wall extending upwardly from said basal wall, said basal wall having a lower portion and an upper portion, said upper portion being vertically offset relative to said lower portion wherein said basal wall is configured to define a seat for the hunter, said perimeter wall having a distal edge with respect to said basal wall, said distal edge having a front section, a back section, and a pair of lateral sections extending between said front section and said back section, each of said lateral sections having a forward portion vertically spaced from and parallel to a lower portion of said basal wall, each of said lateral sections having an upwardly angled portion extending from said front portion to said back section of said distal edge wherein said back section is vertically offset relative to said front section of said distal edge;
a cover being removably positioned on said box wherein said cover is configured to conceal the hunter thereby inhibiting game from seeing the hunter, said cover having an opening therein wherein said opening in said cover is configured to have a weapon extended outwardly therefrom thereby facilitating the hunter to shoot the game; and
a power supply being coupled to said box wherein said power supply is configured to supply power to an extrinsic electronic device.

2. The assembly according to claim 1, wherein said basal wall has a lower surface and an upper surface, said perimeter wall having an inwardly facing surface.

3. The assembly according to claim 2, wherein said box has a first wall extending upwardly between said lower portion and said upper portion, said lower surface corresponding to each of said lower portion and said upper portion being configured to rest on a lower bounding surface of the hole having said distal edge being aligned with the ground, said upper surface corresponding to said upper portion being configured to have the hunter sit thereon.

4. The assembly according to claim 2, further comprising a lip being coupled to and extending outwardly from said perimeter wall, said lip being aligned with and being coextensive with said distal edge wherein said lip is configured to lie on the ground when said box is positioned in the hole.

5. The assembly according to claim 2, further comprising a plurality of steps, each of said steps being coupled to said inwardly facing surface of said perimeter wall, each of said steps being horizontally oriented wherein each of said steps is configured to be stood on to enter said box, said steps being spaced apart from each other and being distributed between said basal wall and said distal edge of said box.

6. The assembly according to claim 1, wherein said cover comprises a surround having a pair of lateral members extending between a front member and a back member, said lateral members being spaced apart from each other such that said surround forms an open rectangle, said surround having a top surface and a bottom surface.

7. The assembly according to claim 6, further comprising a pair of catches, each of said catches being coupled to and extending downwardly from said bottom surface of an associated one of said lateral members, each of said catches being coextensive with said associated first member.

8. The assembly according to claim 7, wherein:
said box includes a lip; and
each of said catches comprises a leg and a foot, said foot corresponding to each of said catches being spaced from said bottom surface to define a lip space between said catches and said surround, said foot corresponding to each of said catches being directed toward each other, said lip space corresponding to each of said catches slidably receiving said lip on said box such that said surround lies on said lip when said cover is positioned on said box.

9. The assembly according to claim 1, further comprising a panel having a first surface, a second surface and a peripheral edge extending therebetween, said peripheral edge having a first lateral side, a second lateral side, a back side and a front side, said panel being concavely arcuate between said first lateral side and said second lateral side.

10. The assembly according to claim 9, wherein:
said cover includes a surround, said surround having a pair of lateral member, a front member and a back member, said surround having a top surface; and
each of said first lateral side and said second lateral side is coupled to said top surface corresponding to an associated one of said lateral members, having said front side arcing upward from said surround to define said opening in said cover, said front side being spaced from said front member, said back side being coupled to said top surface of said back member.

11. The assembly according to claim 1, further comprising a shelf having an upper surface, a lower surface, and an outer edge extending therebetween, said outer edge having a first lateral side, a second lateral side and a rear side, said first lateral side of said shelf having a first notch extending toward said second lateral side of said shelf, said first notch being aligned with said rear side, said second lateral side of said shelf having a second notch extending toward said first lateral side of said shelf, said second notch being aligned with said rear side.

12. The assembly according to claim 11, wherein:
said cover includes a surround, said surround having a said lower surface and a front side; and
said lower surface of said shelf abuts said top surface corresponding to said lateral members of said surround having said front edge of said panel extending into each of said first notch and said second notch, said upper surface being spaced from said front side of said panel wherein said upper surface is configured to support the weapon thereby facilitating the weapon to shoot from said box.

13. The assembly according to claim 11, further comprising a stop being coupled to and extending downwardly from said lower surface of said shelf, said stop being aligned with and being coextensive with said rear side of said shelf.

14. The assembly according to claim 9, wherein said power supply comprises a solar panel being coupled to said first surface of said panel wherein said solar panel is configured to be exposed to sunlight.

15. The assembly according to claim 14, further comprising:
a plurality of steps; and
a battery being positioned on a selected one of said steps, said battery being electrically coupled to said solar panel such that said solar panel charges said battery.

16. The assembly according to claim 15, further comprising an inverter being positioned on a selected one of said steps, said inverter being electrically coupled to said battery such that said inverter converts DC current from said battery into AC current, said inverter being configured to be electrically coupled to the extrinsic electronic device.

17. A below ground blind assembly being configured to facilitate a hunter to be positioned below ground, said assembly comprising:
a box being configured to be positioned in a hole in the ground thereby facilitating a hunter to sit in said box, said box having a basal wall and a perimeter wall extending upwardly from said basal wall, said basal wall having a lower portion and an upper portion, said upper portion being vertically offset relative to said lower portion wherein said basal wall is configured to define a seat for the hunter, said perimeter wall having a distal edge with respect to said basal wall, said distal edge having a front section, a back section, and a pair of lateral sections extending between said front section and said back section, each of said lateral sections having a forward portion vertically spaced from and parallel to a lower portion of said basal wall, each of said lateral sections having an upwardly angled portion extending from said front portion to said back section of said distal edge wherein said back section is vertically offset relative to said front section of said distal edge, said box having a first wall extending upwardly between said lower portion and said upper portion, said lower surface corresponding to each of said lower portion and said upper portion being configured to rest on a lower bounding surface of the hole having said distal edge being aligned with the ground, said upper surface corresponding to said upper portion being configured to have the hunter sit thereon;

a lip being coupled to and extending outwardly from said perimeter wall, said lip being aligned with and being coextensive with said distal edge wherein said lip is configured to lie on the ground when said box is positioned in the hole;

a plurality of steps, each of said steps being coupled to said inwardly facing surface of said perimeter wall, each of said steps being horizontally oriented wherein each of said steps is configured to be stood on to enter said box, said steps being spaced apart from each other and being distributed between said basal wall and said distal edge of said box;

a cover being removably positioned on said box wherein said cover is configured to conceal the hunter thereby inhibiting game from seeing the hunter, said cover having an opening therein wherein said opening in said cover is configured to have a weapon extended outwardly therefrom thereby facilitating the hunter to shoot the game, said cover comprising:

a surround having a pair of lateral members extending between a front member and a back member, said lateral members being spaced apart from each other such that said surround forms an open rectangle, said surround having a top surface and a bottom surface,     a pair of catches, each of said catches being coupled to and extending downwardly from said bottom surface of an associated one of said lateral members, each of said catches being coextensive with said associated first member, each of said catches comprising a leg and a foot, said foot corresponding to each of said catches being spaced from said bottom surface to define a lip space between said catches and said surround, said foot corresponding to each of said catches being directed toward each other, said lip space corresponding to each of said catches slidably receiving said lip on said box such that said surround lies on said lip when said cover is positioned on said box,     a panel having a first surface, a second surface and a peripheral edge extending therebetween, said peripheral edge having a first lateral side, a second lateral side, a back side and a front side, said panel being concavely arcuate between said first lateral side and said second lateral side, each of said first lateral side and said second lateral side being coupled to said top surface corresponding to an associated one of said lateral members, having said front side arcing upward from said surround to define said opening in said cover, said front side being spaced from said front member, said back side being coupled to said top surface of said back member, and     a shelf having an upper surface, a lower surface, and an outer edge extending therebetween, said outer edge having a first lateral side, a second lateral side and a rear side, said first lateral side of said shelf having a first notch extending toward said second lateral side of said shelf, said first notch being aligned with said rear side, said second lateral side of said shelf having a second notch extending toward said first lateral side of said shelf, said second notch being aligned with said rear side, said lower surface abutting said top surface corresponding to said first lateral members of said surround having said front edge of said panel extending into each of said first notch and said second notch, said upper surface being spaced from said front side of said panel wherein said upper surface is configured to support the weapon thereby facilitating the weapon to shoot from said box;

a stop being coupled to and extending downwardly from said lower surface of said shelf, said stop being aligned with and being coextensive with said rear side of said shelf, and a power supply being coupled to said box wherein said power supply is configured to supply power to an extrinsic electronic device, said power supply comprising:

a solar panel being coupled to said first surface of said panel wherein said solar panel is configured to be exposed to sunlight,     a battery being positioned on a selected one of said steps, said battery being electrically coupled to said solar panel such that said solar panel charges said battery, and     an inverter being positioned on a selected one of said steps, said inverter being electrically coupled to said battery such that said inverter converts DC current from said battery into AC current, said inverter being configured to be electrically coupled to the extrinsic electronic device.

* * * * *